United States Patent
Song et al.

(10) Patent No.: US 11,464,057 B2
(45) Date of Patent: Oct. 4, 2022

(54) METHOD AND APPARATUS FOR HIGH SPEED PROCESSING OF GTP-U PACKET IN A MOBILE NETWORK

(71) Applicant: SYSMATE CO., LTD., Daejeon (KR)

(72) Inventors: Byungkon Song, Seoul (KR); Yookyoung Lee, Sejong-si (KR); Ganho Choi, Daejeon (KR); Huijin Jang, Daejeon (KR)

(73) Assignee: SYSMATE CO., LTD., Daejeon (KR)

( * ) Notice: Subject to any disclaimer, the term of this patent is extended or adjusted under 35 U.S.C. 154(b) by 67 days.

(21) Appl. No.: 17/101,269

(22) Filed: Nov. 23, 2020

(65) Prior Publication Data

US 2022/0159750 A1    May 19, 2022

(30) Foreign Application Priority Data

Nov. 19, 2020  (KR) .................. 10-2020-0155916

(51) Int. Cl.
*H04W 76/12*  (2018.01)
*H04W 76/11*  (2018.01)
*H04L 12/46*  (2006.01)
*H04W 8/08*   (2009.01)

(52) U.S. Cl.
CPC ......... *H04W 76/12* (2018.02); *H04L 12/4633* (2013.01); *H04W 8/082* (2013.01); *H04W 76/11* (2018.02)

(58) Field of Classification Search
CPC ..... H04W 76/12; H04W 76/11; H04W 8/082; H04L 12/4633
See application file for complete search history.

(56) References Cited

U.S. PATENT DOCUMENTS

| | | |
|---|---|---|
| 10,608,842 B2 | 3/2020 | Shi et al. |
| 2012/0076120 A1* | 3/2012 | Kowali .................. H04W 76/11 370/338 |
| 2018/0176039 A1 | 6/2018 | Shi et al. |
| 2020/0137726 A1* | 4/2020 | Luo ..................... H04L 12/4633 |
| 2020/0245182 A1* | 7/2020 | Chitta ............... H04W 28/0252 |
| 2021/0112447 A1* | 4/2021 | Ogura ................. H04W 88/181 |

FOREIGN PATENT DOCUMENTS

| | | |
|---|---|---|
| KR | 10-2018-0034632 A | 4/2018 |
| KR | 10-2019-0098693 A | 8/2019 |

OTHER PUBLICATIONS

Korean Office Action dated Dec. 24, 2020 in counterpart Korean Patent Application No. 10-2020-0155916 (5 pages in Korean).

* cited by examiner

*Primary Examiner* — Min Jung
(74) *Attorney, Agent, or Firm* — NSIP Law (57) ABSTRACT

Disclosed are a method and apparatus for high-speed processing of GTP-U packets in a mobile network. The packet processing method and the apparatus according to an embodiment implements the encapsulation or decapsulation of GTP-U packets in a mobile network in a hardware-based structure to process the LBO of the GTP-U packet at high speed. It achieves the processing and solves the difficulty of protocol interworking with the mobile core network as information for the encapsulation or decapsulation processing of the GTP-U packet independently is acquired through self-learning without the help of the mobile core network.

13 Claims, 11 Drawing Sheets

METHOD AND APPARATUS FOR HIGH SPEED PROCESSING OF GTP-U PACKET IN A MOBILE NETWORK

CROSS-REFERENCE TO RELATED APPLICATION(S)

This application claims priority from Korean Patent Application No. 10-2020-0155916, filed on Nov. 19, 2020, in the Korean Intellectual Property Office, the disclosure of which is incorporated herein by reference in its entirety.

BACKGROUND

1. Field

The following description relates to a technique for packet processing, and more particularly, to a technique for high speed processing a packet of General Packet Radio Service (GPRS) tunneling protocol user plane (GTP-U) in a mobile network.

2. Description of Related Art

When a user packet is transmitted to a local server in a mobile communication network, concepts of Mobile Edge Computing (MEC) and Local Break OUT (LBO) have been introduced and applied, to realize low packet delay and high speed packet processing.

The MEC can effectively perform low packet delay and high-performance traffic processing by allowing the Internet service server to be located in the user access area and to directly connect the service connection path through the LBO.

Functions of the MEC and LBO are very useful for low packet delay and high-performance traffic processing required for new services such as smart cars and smart factories that are expanding in the future.

In order to implement the functions of the MEC and LBO, interworking with the mobile core network and processing of related protocols are required. In the past, the LBO in the MEC is generally implemented using CPU and software in general. However, since the software implementation method depends on the CPU processing performance, there are limitations in low packet delay and high-performance traffic processing.

SUMMARY

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

The following description suggests a method and apparatus of packet processing capable of high-speed processing of LBO of GTP-U packets independently of the mobile core network.

In one general aspect, a method of processing packet of General Packet Radio Service (GPRS) tunneling protocol user plane (GTP-U), using a packet processing apparatus in a mobile network, includes obtaining information for encapsulation or decapsulation of the GTP-U packet; decapsulating the GTP-U packet and generating a learning table using the obtained information; and encapsulating to GTP-U packet by using the generated learning table.

The obtaining information for encapsulation or decapsulation of the GTP-U packet, may obtain an IP information of outer IP-Header (IP-H), a tunneling endpoint identifier (TEID) information and an IP information of inner IP-Header (IP-H) from the input GTP-U packet, and wherein the IP information of the outer IP-H is an IP address of the base station, the IP information of the inner IP-H is an IP address of the user element, and the TEID information is a tunnel ID distinguished for each user element.

The obtaining information for encapsulation or decapsulation of the GTP-U packet may further include, transmitting a GTP-U packet having a predetermined UDP-Header (UDP-H) destination port value among the input GTP-U packet to an IP-H separation logic and bypassing the remaining packets; extracting an outer IP-H information from the GTP-U packet using IP-H separation logic; extracting a TEID information from the GTP-U packet using GTP-Header (GTP-H) separation logic; and extracting an inner IP-H information from the GTP-U packet using inner IP-H separation logic.

The obtaining information for encapsulation or decapsulation of the GTP-U packet, may obtain the information for encapsulation or decapsulation of the GTP-U packet by using GPRS Tunneling Protocol Control (GTP-C) packet.

The obtaining information for encapsulation or decapsulation of the GTP-U packet may further include, by an UDP-H Port GTP packet verification logic, determining a GTP-C packet from the input packet; and obtaining the information for encapsulation or decapsulation of the GTP-U packet from the input GTP-C packet according to a value of message type, by checking the value of the message type of a GTP-C packet header.

The encapsulating to GTP-U packet may further include, searching the learning table for a source IP address of an inner IP header that matches the destination IP address of the IP header of the input packet; and encapsulating to GTP-U packet with the value of TEID and IP information of IP-H in the matched learning table according to the search result.

The searching the learning table may search the learning table for an index value having the source IP value of the inner IP-H of the learning table that matches the destination IP value of the IP-H of the input packet, and the encapsulating to GTP-U packet may further include, generating a GTP-H in the input packet by using the TEID value of the learning table having the searched index value by a GTP header adder logic, and then encapsulating the input packet containing the GTP-H; generating a UDP-H in the input packet by a UDP header adder logic and then encapsulating the input packet containing the UDP-H; generating an outer IP-H in the input packet by using the outer IP-H value of the learning table having the searched index value by an outer IP header adder logic, and encapsulating the input packet containing the IP-H; and generating an Ether-Header (Ether-H) in the input packet by an Ether-H adder logic, encapsulating the input packet containing the Ether-H and generating an output GTP-U packet.

The method may further include transmitting the local IP packet generated by decapsulating the GTP-U packet to a local server, if the destination IP address of the inner IP-H of the GTP-U packet corresponds to the address of the LBO area.

The method may further include, when data is registered in the learning table, deleting the index of the corresponding learning table if the count value is more than the predetermined default value after checking the count value of the learning table at a preset default time using an external timer.

The method may further include, determining a GTP-C packet from the input packet; and deleting the index of the learning table having a predetermined value of message type, by checking the value of the message type of the GTP-C packet header.

In another general aspect, an apparatus of processing packet may include a network interface for transmitting and receiving packets; an FPGA unit for obtaining information for decapsulation of the GTP-U packet received through the network interface or encapsulation of the GTP-U packet to be transmitted through the network interface, and generating a learning table using the information obtained by decapsulating GTP-U packet or encapsulating to GTP-U packet using the generated learning table; and a memory storing the learning table.

The FPGA unit may obtain an IP information of outer IP-H, a TEID information and an IP information of inner IP-H from the input GTP-U packet, and wherein the IP information of the outer IP-H is an IP address of the base station, the IP information of the inner IP-H is an IP address of the user element, and the TEID information is a tunnel ID distinguished for each user element.

The FPGA unit may search the learning table for a source IP address of an inner IP header that matches the destination IP address of the IP header of the input packet; and encapsulate GTP-U packet with the value of TEID and IP information of IP-H in the matched learning table according to the search result.

The FPGA unit may delete the index of the corresponding learning table if the count value is more than the preset default value after checking the count value of the learning table at a preset default time using an external timer, when data is registered in the learning table.

The FPGA unit may obtain the information for encapsulation or decapsulation of the GTP-U packet by using GTP-C packet Other features and aspects will be apparent from the following detailed description, the drawings, and the claims.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be clear to those of ordinary skill in the art. Also, descriptions of well-known functions and constructions may be omitted for increased clarity and conciseness.

Advantages and features of the present disclosure and methods of achieving them will be apparent from embodiments described below in detail in conjunction with the accompanying drawings. However, the present disclosure is not limited to the embodiments below and may be embodied in many different forms. Rather, these embodiments are provided so that this disclosure will be thorough and complete and will fully convey the concept of the invention to those of ordinary skill in the art. The present disclosure should be defined by the scope of the claims. The same reference numerals refer to the same components throughout the specification.

In describing embodiments of the present disclosure, well-known functions or constructions are not described in detail when it is determined that they would obscure the invention due to unnecessary detail. The terms described below are defined in consideration of functions of the embodiments of the present disclosure and may vary according to the intention of a user or operator, precedent, or the like. Therefore, the terms should be defined based on the whole context of the present disclosure.

Combinations of operations of blocks of each block diagram attached hereto and operations of each flowchart attached hereto may be performed by computer program instructions (execution engines). The computer program instructions may be stored in a processor of a general purpose computer, a special purpose computer, or other programmable data processing devices. Thus, a means to perform a function of each block of each block diagram or an operation of each flowchart is produced by the instructions executed by a processor of a computer or other programmable data processing devices.

The computer program instructions may be stored in a computer usable or readable memory oriented to a computer or other programmable data processing devices to implement functions in a particular way. Thus, an article of manufacture, including an instruction means for performing the function of each block of each block diagram or each operation in each flowchart, may be produced by the instructions stored in the computer usable or readable memory.

Because the computer program instructions may be stored in a computer or other programmable data processing devices, the functions of the blocks of each block diagram and the operations of each flowchart may be provided by these instructions performing a series of operations in the computer or the other programmable data processing devices to produce a process executable by a computer to operate the computer or the data processing device.

In addition, each block or each operation may represent a module, a segment, or part of code that includes one or more executable instructions for executing specified logical functions. In some alternative embodiments, functions referred to with respect to blocks or operations may be performed in an order different from that described herein. For example, two blocks or operations illustrated consecutively may be performed substantially simultaneously or in a reverse order of functions corresponding thereto when necessary.

Hereinafter, embodiments of the present disclosure will be described in detail with reference to the accompanying drawings. However, the embodiments of the present disclosure described below may be modified in various other forms and the scope of the present disclosure is not limited thereto. Embodiments of the present disclosure are provided to more fully describe the present disclosure to those of ordinary skill in the art.

Figure 1:
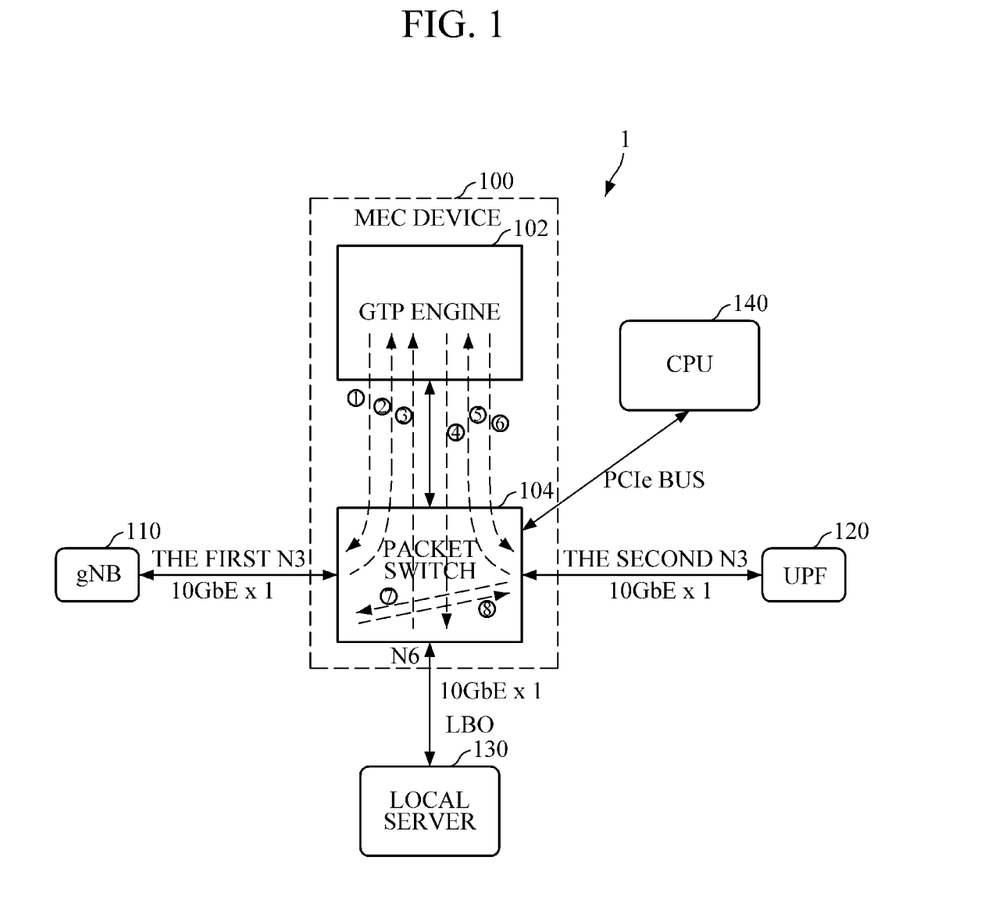
FIG. 1 is a schematic diagram showing the configuration of a packet processing system according to an embodiment of the present invention.

FIG. 1 is a schematic diagram showing the configuration of a packet processing system according to an embodiment of the present invention.

Referring to FIG. 1, the packet processing system 1 comprises a mobile edge computing (MEC) device 100, a base station (gNodeB, hereinafter referred to as 'gNB') 110, User Plane Function (UPF) 120, a local server 130, and a CPU 140.

As cloud computing capabilities and IT service environments are provided at the mobile network edge, the MEC device 100 alleviates congestion of the mobile core network and creates new local services. The MEC device 100 according to an embodiment is implemented in hardware, not software, and Local Break OUT (LBO) is processed at high speed independently of the mobile core network in the mobile edge computing data plane (MEC-DP, hereinafter referred to as 'MEC-DP'). It should be noted that the hardware-based MEC device 100 is separated from the software-based CPU 140 in FIG. 1.

The LBO allows a mobile network operator (MNO) to provide users with a data ordering function directly provided by the visited mobile network. LBO allows users to receive data services directly from the mobile network they visit.

The MEC device 100 according to an embodiment processes LBO with high speed and low delay for the General Packet Radio Service (GPRS) tunneling protocol user plane (GTP-U) packet independently of the mobile core network. The GTP-U packet is an IP-based communication protocol packet used to transmit GPRS within a mobile communication network.

The MEC device 100 according to an embodiment has a hardware structure for processing LBO from a GTP-U packet with high speed and low delay through encapsulation or decapsulation of GTP-U packets. The MEC device 100 obtains information necessary to perform encapsulation or decapsulation of the GTP-U packets, and uses the obtained information to self-learn packets without the help of a mobile core network, and a learning table can be configured. The MEC device 100 may obtain information for encapsulation or decapsulation of the GTP-U packet by using a GPRS tunneling protocol control (GTP-C) packet.

The MEC device 100 defines, as information necessary to perform encapsulation or de-encapsulation of GTP-U packets, the IP address of the gNB 110 and the IP address of the user element (UE) and a tunneling endpoint identifier (TEID) that is differentiated for each UE is defined, and thus defined information is obtained.

In order to increase the reliability of the learned information, the MEC device 100 may set Time Out and delete information after the Time Out, and Termination information such as TEID can be obtained through the GPRS Tunneling Protocol Control (GTP-C).

The gNB 110, UPF 120, N3, and N6 of FIG. 1 illustrate functions and reference points displayed in the 5G reference model as an example. The N3 is a GTP tunnel interface formed between the gNB 110 and the UPF 120. The UPF 120 is an example of a function of the mobile core network, and may be replaced with other functions.

The MEC device 100 represents a packet processing function block for implementing the MEC LBO function in a mobile communication structure, and may include a GTP engine 102 and a packet switch 104.

For high-speed packet processing, the GTP engine 102 may be implemented with field programmable gate array (FPGA) hardware, and the packet switch 104 may be implemented using a general-purpose chip. For example, the GTP engine 102 is implemented in hardware design to achieve a GTP packet processing of 40 Gbps or more and a packet delay of 100 usec or less.

The CPU 140 is connected through a PCIe interface to control the GTP engine 102 and the packet switch 104 of the MEC device 100, and is controlled by software if necessary.

Hereinafter, paths ① to ⑧ of processing input/output packets of the GTP engine 102 at the MEC location under the mobile communication network structure will be described below with reference to FIG. 1.

Path ①: The packet type transmitted through this path is a GTP-U type packet. This packet is a packet encapsulated into a GTP-U packet from a user IP packet input through N6 and path ③, or a packet in which a packet input through the second N3 and path ⑤ is bypassed. The GTP engine 102 transmits the GTP-U packet to the gNB 110 through the first N3 and path ①. A method of encapsulating into the first N3 GTP-U packet from the user IP packet input from N6 will be described later with reference to FIG. 2.

Path ②: As a packet introduced from a user, the packet input from the first N3 is transmitted to the GTP engine 102. This packet is applicable only in the case of the GTP-U type, and other packets are bypassed to the second N3. The packet input to the GTP engine 102 through path ② is of the GTP-U type, and the destination IP address of the packet's inner IP Header (IP-H) is checked. If the destination IP address corresponds to the address of the Local Break Out (LBO) area, it is decapsulated and transmitted to N6 in the form of a local IP packet through the packet switch 104.

Path ③: As a packet input from N6, the user IP packet is encapsulated in the GTP engine 102 in the form of a GTP-U packet, and then transmitted to the gNB 110 through path ①. A method of encapsulating a packet in the GTP engine 102 will be described later with reference to FIG. 2.

Path ④: This is a path through which packets are transmitted from the GTP engine 102 to N6. The GTP engine 102 analyzes the destination IP address of the inner IP-H from the GTP-U packet among packets introduced from the gNB 110 to determine whether the destination IP address corresponds to the address of the LBO area. According to the determination result, if the address is in the LBO area, the GTP-U packet is decapsulated and then transmitted to N6 through the path ④, thereby the LBO effectively performed. A method of decapsulating a packet in the GTP engine 102 will be described later with reference to FIG. 2.

Path ⑤: This is a path for transmitting a packet corresponding to the GTP type among packets input from the UPF 120 to the GTP engine 102. The packets are used to extract GTP header information from the GTP engine 102, and these packets are transmitted to the gNB 110 without change through path ①.

Path ⑥: This is a path through which GTP engine 102 transmits GTP-U type packets to UPF 120. The GTP engine 102 transmits a packet other than the packet in the LBO region among the GTP-U packets input through the path ② from the gNB 110 to the UPF 120 through the path ⑥ without change.

Path ⑦: The packet input from the UPF 120, which does not need to be inspected and changed in the GTP engine 102, is directly transmitted to the gNB 110.

Path ⑧: Among packets input from the gNB 110, packets other than GTP packets are directly transmitted to the UPF 120 through path ⑧.

Figure 2:
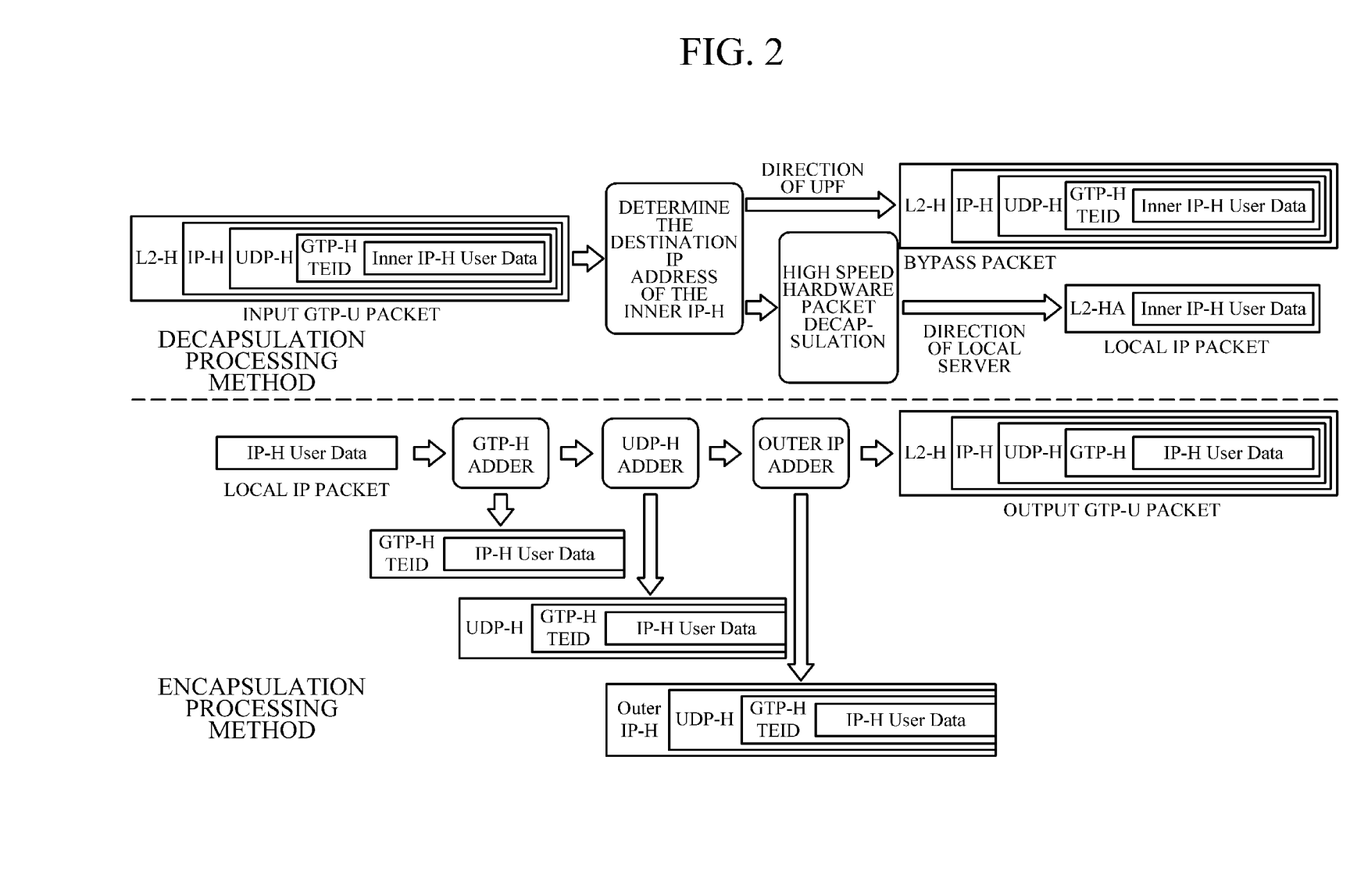
FIG. 2 is a schematic diagram showing a packet encapsulation or decapsulation processing method in a GTP engine according to an embodiment of the present invention.

FIG. 2 is a schematic diagram showing a packet encapsulation or decapsulation processing method in a GTP engine according to an embodiment of the present invention.

Referring to the FIG. 1 and FIG. 2, the GTP engine 102 determines the destination IP address of the inner IP-H from the input packet of the GTP-U type (hereinafter referred to as 'input GTP-U packet'). Thus, if it is in the direction of UPF 120, bypass is performed without change (bypass packet). Otherwise, if it is in the direction of the local server 130, the input GTP-U packet is decapsulated and then the extracted local IP packet through decapsulation is transmitted to the local server 130.

On the other hand, when the GTP engine 102 receives the local IP packet, the GTP-H TEID is encapsulated through the GTP Header (GTP-H, hereinafter referred to as 'GTP-H') adder, and UTP-H is encapsulated through the UTP Header (UTP-H, hereinafter It is referred to as 'UTP-H') adder, outer IP-H is encapsulated through outer IP adder, and finally Ether Header (Ether-H, hereinafter referred to as 'Ether-H') is encapsulated to generate an output GTP-U packet.

Figure 3:
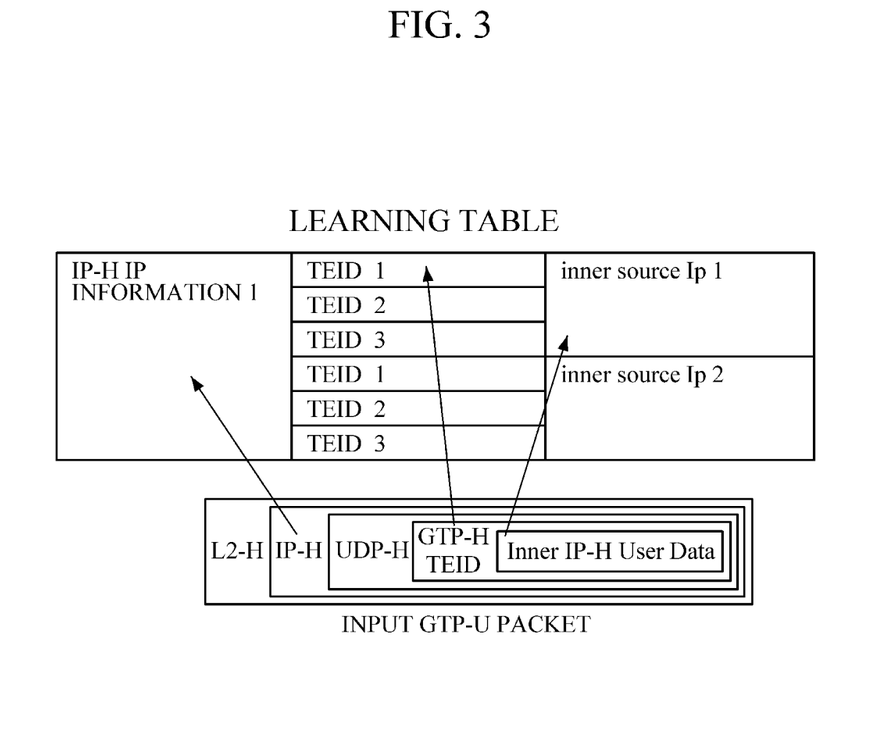
FIG. 3 is a schematic diagram showing a method of generating a Learning Table through self-learning by obtaining information for processing a GTP-U packet according to an embodiment of the present invention.

FIG. 3 is a schematic diagram showing a method of generating a Learning Table through self-learning by obtaining information for processing a GTP-U packet according to an embodiment of the present invention.

Referring to the FIG. 1 and FIG. 3, the GTP engine 102 generates a learning table by self-learning packets without involvement of a mobile core network. The GTP engine 102 captures the input GTP-U packet introduced from the gNB 110 to obtain information necessary for encapsulation or decapsulation. At this time, the necessary information may include a source IP information of outer IP-H, a destination IP information of outer IP-H, a GTP-H information, a source IP information of inner IP-H, and destination IP information of inner IP-H. The source IP information of the outer IP-H may be the IP address of the gNB 110, the destination IP information of the outer IP-H may be the IP address of the local server 130 or the address of the UPF 120, and the GTP-H information may be a tunneling endpoint identifier (TEID, hereinafter referred to as 'TEID'), which is a tunnel ID that is distinguished for each user element (UE), and the source IP information of the inner IP-H and the destination IP information may be an IP address of a user element (UE).

The GTP engine 102 decapsulates the input GTP-U packet to generate a learning table including the obtained information, and an example of the learning table is as shown in FIG. 3.

Figure 4:
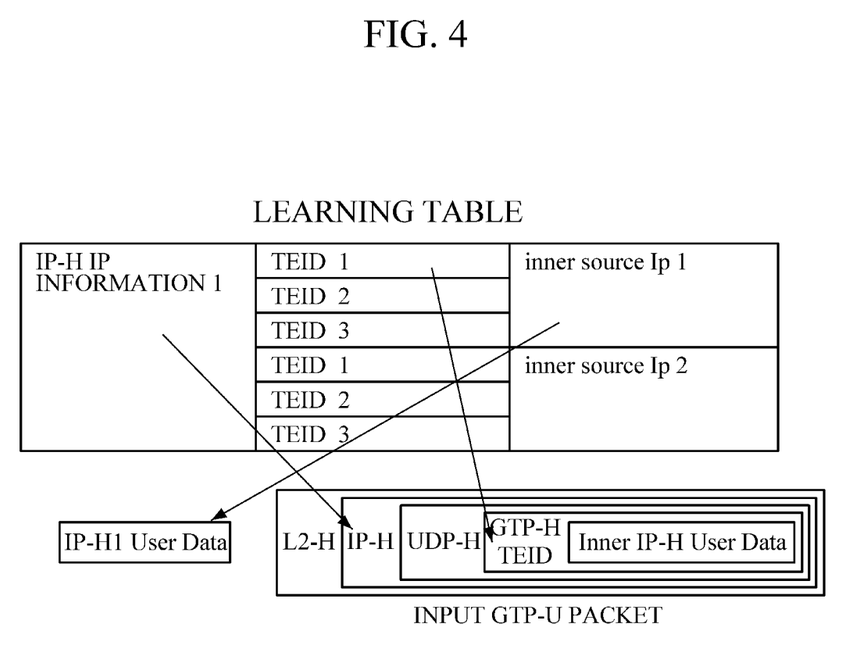
FIG. 4 is a diagram explaining a method of encapsulating to a GTP-U packet using a learning table according to an embodiment of the present invention.

FIG. 4 is a diagram explaining a method of encapsulating to a GTP-U packet using a learning table according to an embodiment of the present invention.

Referring to the FIG. 1 and FIG. 4, the GTP engine 102 searches a learning table for a source IP address of an inner IP header that matches a destination IP address of IP-H of an input packet.

According to the search result, it encapsulates into GTP-U packets with the TEID value and IP-H IP information in the matched learning table. For example, the GTP-H TEID of the GTP-U packet is configured by using the TEID value in the learning table, and the outer I IP-H of the GTP-U packet is configured by using the IP-H IP information in the learning table.

Figure 5:
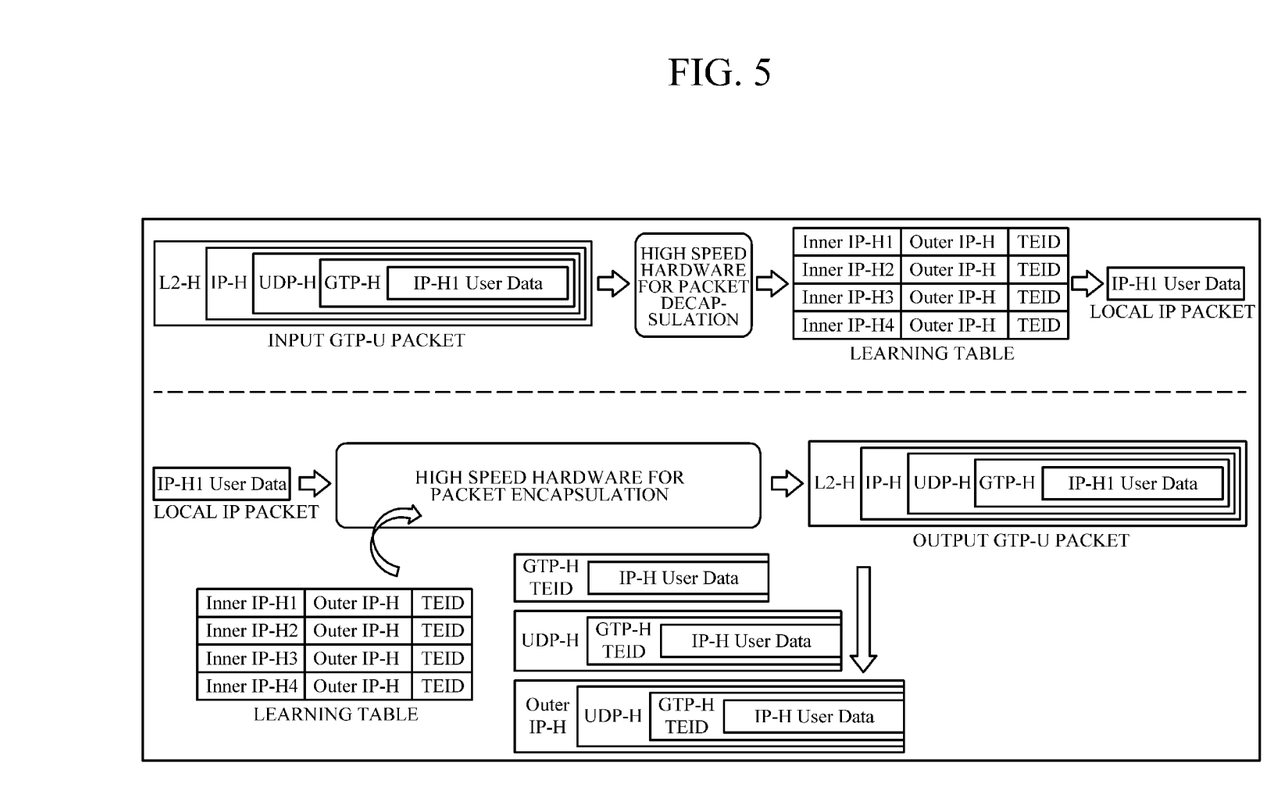
FIG. 5 is a diagram showing an example of building and processing a learning table using hardware according to an embodiment of the present invention.

FIG. 5 is a diagram showing an example of building and processing a learning table using hardware according to an embodiment of the present invention.

According to the data processing method of the conventional software method, a CPU reads and writes the input packet data to memory. In this case, it depends on the performance of the CPU and the access speed of the memory. In contrast, the hardware-based data processing method according to an embodiment enables ultra-high-speed processing by designing a logic implementation compared to a CPU, and implements high-performance and ultra-low delay processing. In this case, the hardware may be the MEC device 100 of FIG. 1.

Referring to the FIG. 5, a learning table may be configured using a hardware based packet processing logic, and conversely, a GTP packet may be generated using information from the learning table. For example, when a GTP-U packet is received, high speed hardware logic for packet decapsulation (eg, the GTP engine of FIG. 1) generates a learning table with information extracted from the input GTP-U packet. Conversely, upon receiving a Local IP packet, high speed hardware logic for packet encapsulation (eg, the GTP engine of FIG. 1) generates an output GTP-U packet with reference to the learning table.

Figure 6:
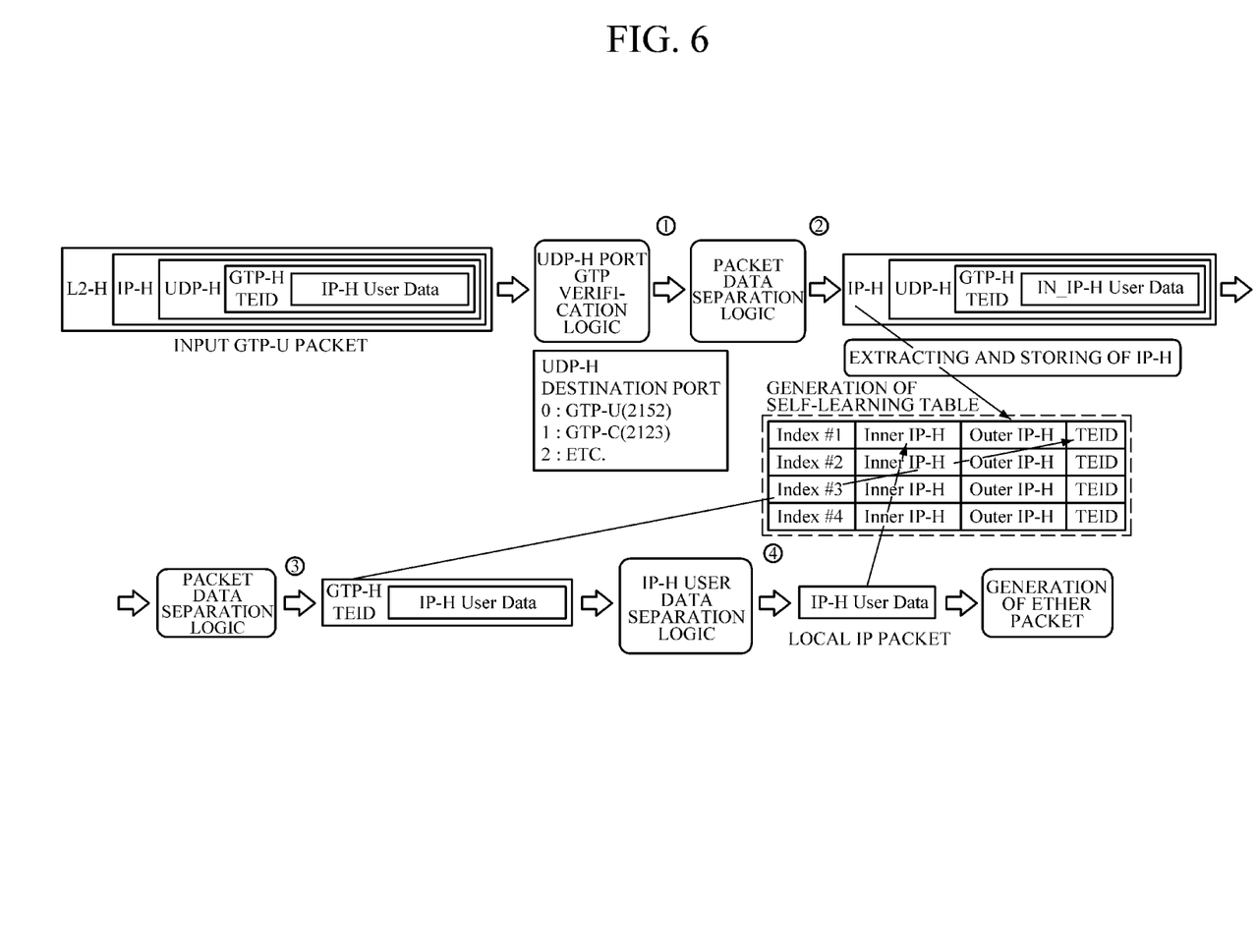
FIG. 6 is a schematic diagram illustrating a process of generating a learning table from an input GTP-U packet according to an embodiment of the present invention.

FIG. 6 is a schematic diagram illustrating a process of generating a learning table from an input GTP-U packet according to an embodiment of the present invention.

Referring to the FIG. 1 and FIG. 6, the MEC device 100 generates a learning table using the GTP engine 102, which is hardware logic. Hereinafter, the learning table generation process of the GTP engine 102 will be described in detail later with reference to FIG. 6.

The GTP engine 102 ① transmits only the GTP-U packets whose UDP-H destination port value is a predetermined value (eg, 2152) in the input GTP-U packet to the IP-H separation logic, and bypasses the remaining packets. ② In the IP-H separation logic, outer IP-H information is extracted and stored from the GTP-U packet. ③ In the GTP-H separation logic, TEID information is extracted and stored from the GTP-U packet. ④ In the inner IP-H separation logic, inner IP-H information is extracted and stored from the GTP-U packet. Consequently, a learning table composed of the inner IP-H information, the TEID information, and the inner IP-H information is generated.

Figure 7:
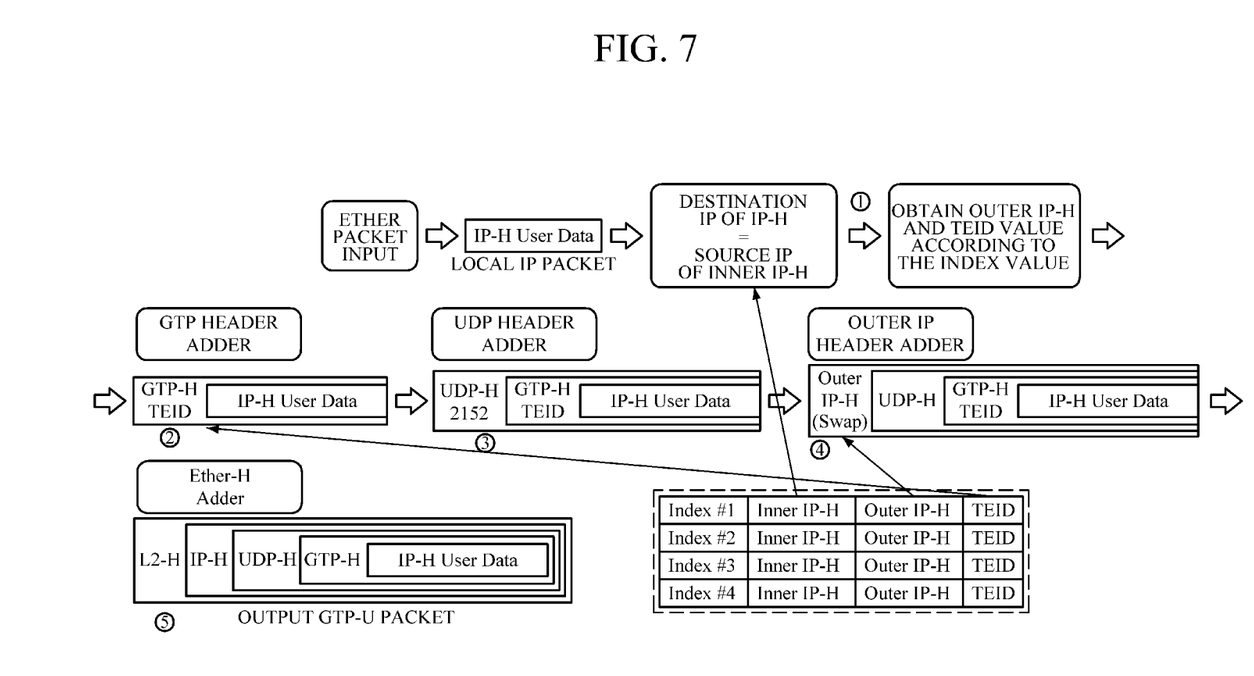
FIG. 7 is a schematic diagram illustrating a process of generating a GTP-U packet using a generated learning table according to an embodiment of the present invention.

FIG. 7 is a schematic diagram illustrating a process of generating a GTP-U packet using a generated learning table according to an embodiment of the present invention.

Referring to the FIG. 1 and FIG. 7, the GTP engine 102 ① searches the learning table for the index value having the source IP value of the inner IP-H of the learning table coincides with the destination IP value of the IP-H of the input packet (the destination IP value of the IP-H=the source IP of the inner IP-H). ② GTP header adder logic generates a GTP-H in the input packet using the TEID value of the learning table with the searched index value and encapsulates it. ③ UDP header adder logic generates a UDP-H in the input packet and encapsulates it. ④ The outer IP header adder logic generates an outer IP-H in the input packet by using the outer IP-H value of the learning table with the searched index value and encapsulates it. ⑤ Finally, the Ether-H adder logic generates an Ether-H in the input packet and encapsulates it to generate the output GTP-U packet.

Figure 8:
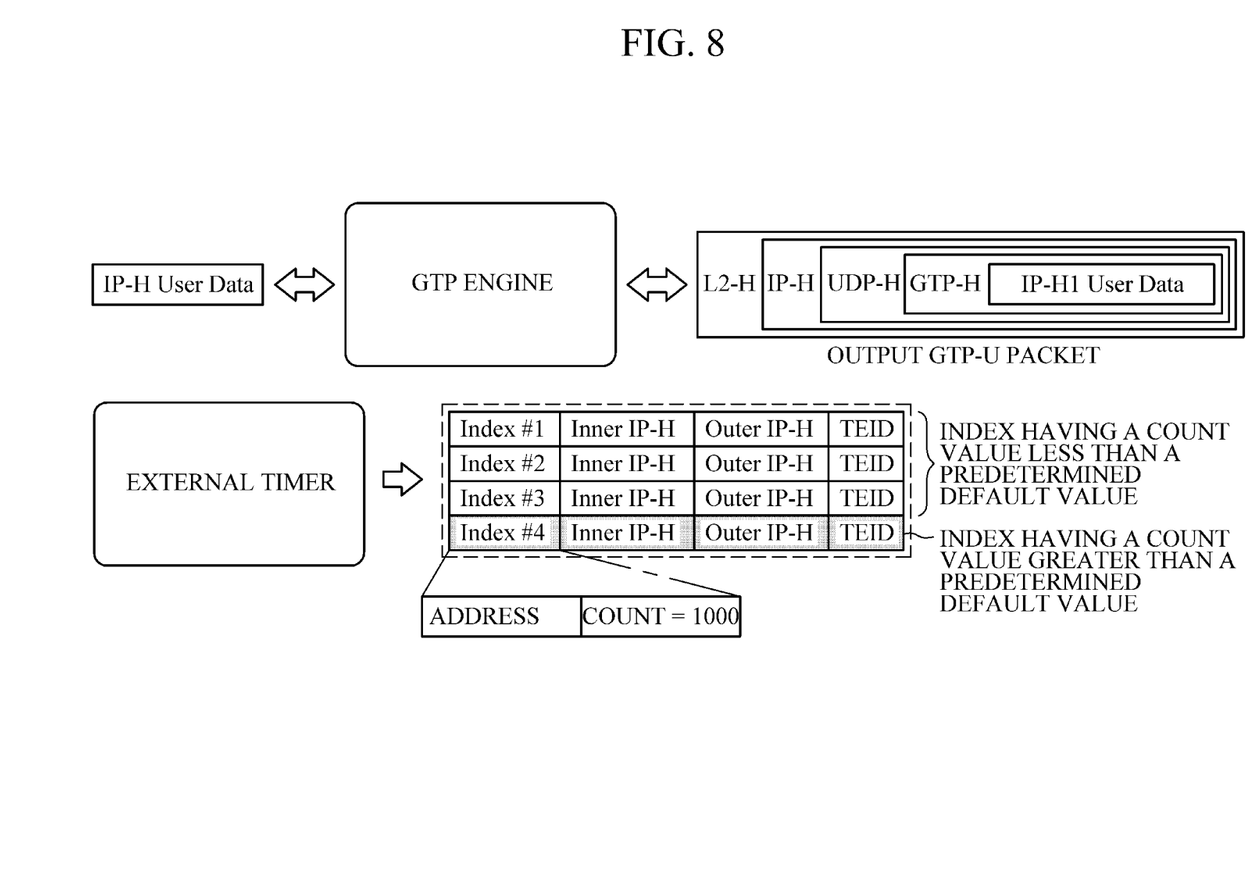
FIG. 8 is a schematic diagram illustrating a process of deleting an index in a learning table using Time Out according to an embodiment of the present invention.

FIG. 8 is a schematic diagram illustrating a process of deleting an index in a learning table using Time Out according to an embodiment of the present invention.

Referring to the FIG. 1 and FIG. 8, when data is registered in the learning table, information continuously increases. Therefore, when the session ends, it is necessary to secure a storage space by deleting predetermined information from the learning table. To this end, when a GTP-U packet is input and information necessary for encapsulation or decapsulation is registered in the learning table, the GTP engine 102 initializes the count value of the index. Thereafter, after checking the count value of the learning table at a predetermined default time (eg, every 5 minutes) using an external timer, an index having a count value less than a predetermined default value (eg, 1,000) may be left as it is, and an index having a count value greater than a predetermined default value (eg, 1,000) may be deleted. In FIG. 8, index #4 is deleted. At this time, the predetermined default time and predetermined default value can be set by the user.

Figure 9:
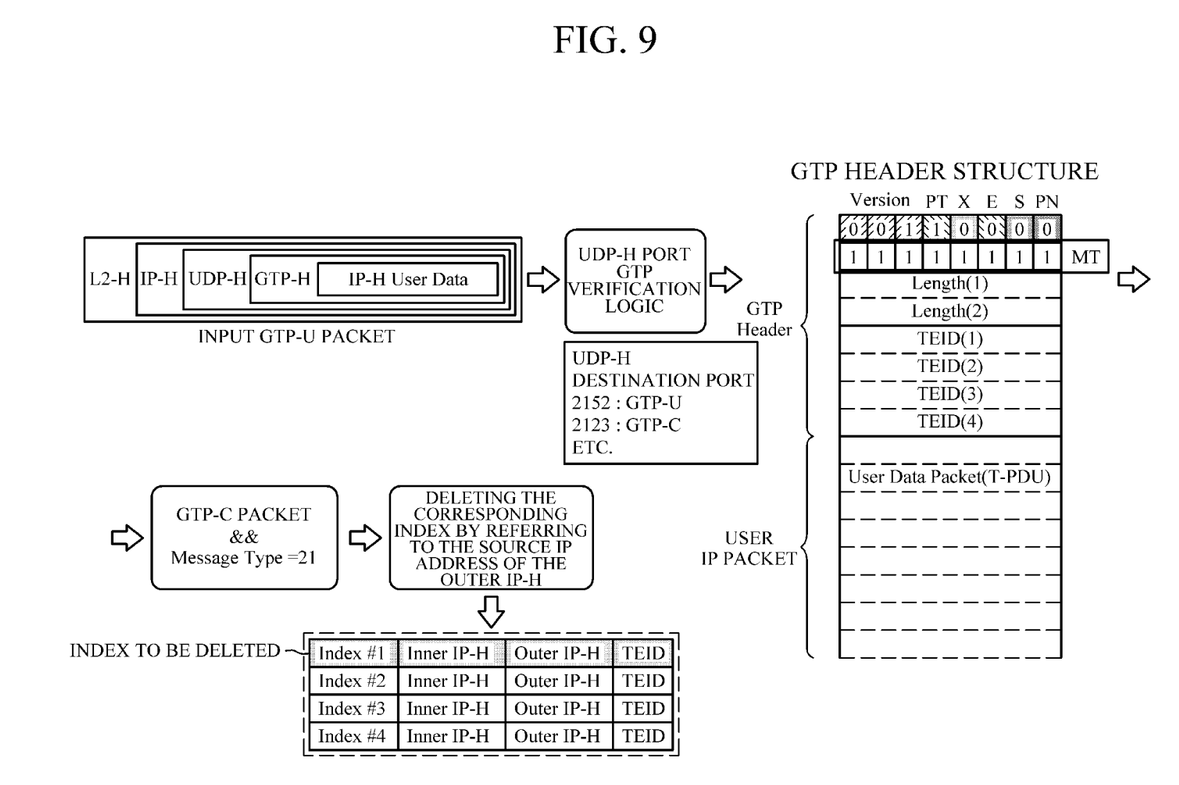
FIG. 9 is a schematic diagram illustrating a process of deleting information in a learning table using a GTP-C packet according to an embodiment of the present invention.

FIG. 9 is a schematic diagram illustrating a process of deleting information in a learning table using a GTP-C packet according to an embodiment of the present invention.

Referring to the FIG. 1 and FIG. 9, the GTP engine 102 may secure a storage space by deleting predetermined information from a learning table when a session ends. For example, the UDP-H Port GTP packet verification logic determines that the port value of the destination port of UDP-H from the input packet is 2152, as GTP-U, and 2123, as GTP-C packet. Subsequently, the index of the learning table having a predetermined message type value (eg, 21) is deleted by checking the message type (MT) value of the GTP-C packet header. The message type value for deletion may vary according to the version of the input GTP-U packet. At this time, the index may be deleted by referring to the source IP address of the outer IP-H of the learning table. In FIG. 9, index #1 is deleted.

Figure 10:
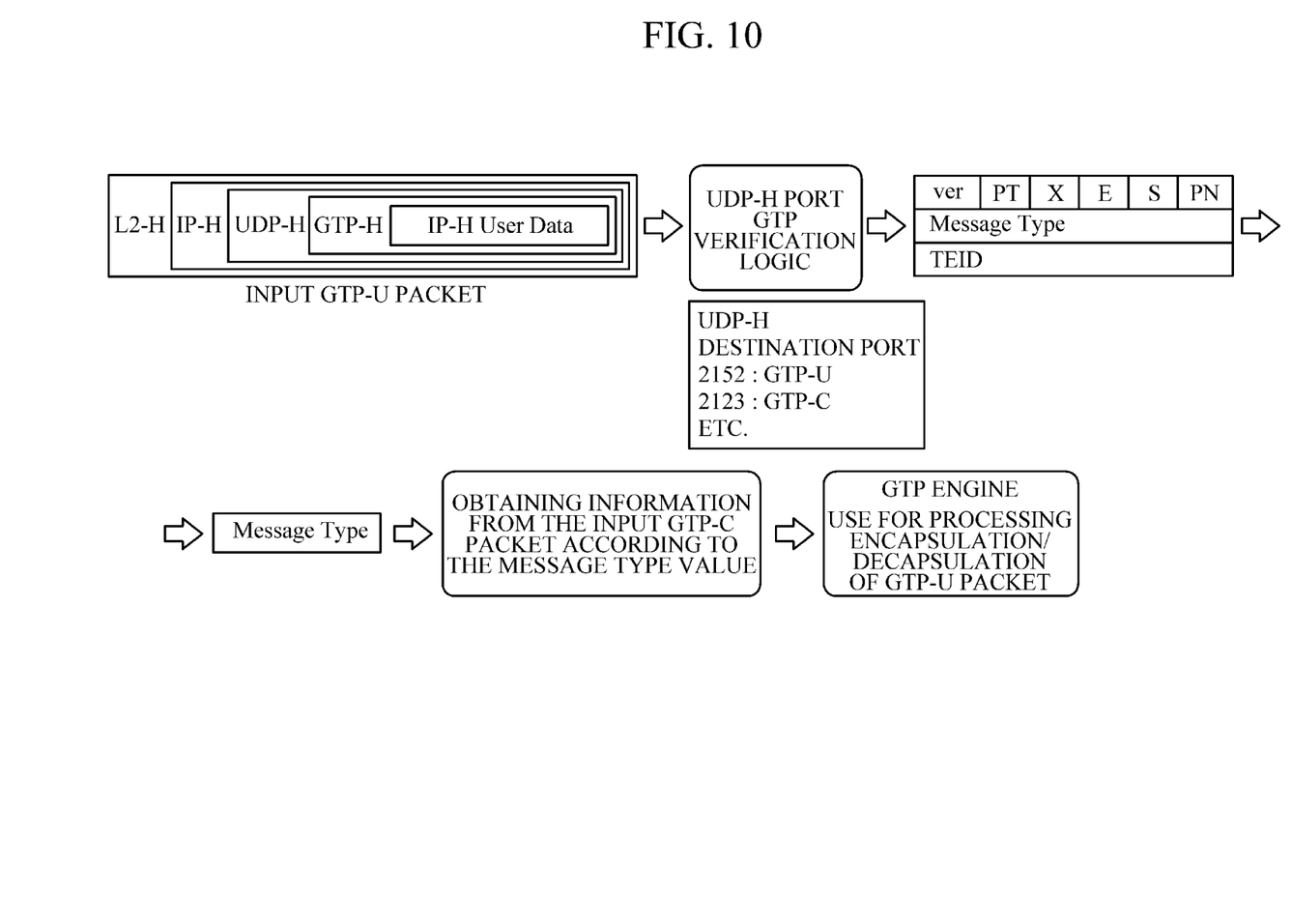
FIG. 10 is a schematic diagram illustrating a process of obtaining information for encapsulation or decapsulation of a GTP-U packet using a GTP-C packet according to an embodiment of the present invention.

FIG. 10 is a schematic diagram illustrating a process of obtaining information for encapsulation or decapsulation of a GTP-U packet using a GTP-C packet according to an embodiment of the present invention.

Referring to the FIG. 1 and FIG. 10, a GTP-C packet is a protocol packet for establishing a GTP session between a gNB and a user plane function (UPF) and a session management function (SMF) of a core network. The GTP engine 102 analyzes the session establishment packet of GTP-C to obtain information for direct GTP-U encapsulation or decapsulation, and decapsulate GTP-U packets or encapsulate them into GTP-U packets by using the obtained information.

For example, as shown in the FIG. 10, in the GTP engine 102, the UDP-H Port GTP packet verification logic determines that the port value of the destination port of UDP-H from the input packet is 2152, as GTP-U, and 2123, as GTP-C packet. Subsequently, the message type value of the GTP-C packet header is checked, and information for GTP-U packet encapsulation or decapsulation is obtained from the input GTP-C according to the message type value. The GTP-U session setting information analysis of the GTP-C packet can be selectively performed in a hardware GTP engine or in an external CPU. Information for GTP-U packet encapsulation or decapsulation includes an IP information of outer IP-H, a TEID information, and an IP information of inner IP-H.

Figure 11:
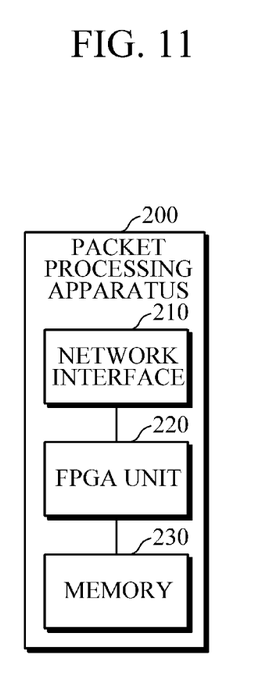
FIG. 11 is a schematic diagram showing the configuration of a packet processing apparatus according to an embodiment of the present invention.

FIG. 11 is a schematic diagram showing the configuration of a packet processing apparatus according to an embodiment of the present invention.

Referring to the FIG. 11, the packet processing apparatus 200 includes a network interface 210, an FPGA unit 220, and a memory 230. The packet processing apparatus 200 may be the hardware-based MEC apparatus 100 of the FIG. 1. Specifically, it may be the GTP engine 102.

The network interface 210 receives input packets and transmits output packets. The input packet includes the input GTP-U packet, and the output packet includes the output GTP-U packet. An example of packet transmission/reception has been described above with reference to the FIG. 1.

The FPGA unit 220 may obtain information for decapsulation of the GTP-U packet received through the network interface or encapsulation of the GTP-U packet to be transmitted through the network interface. And the FPGA unit 220 may generates a learning table using the information obtained by decapsulating GTP-U packet or encapsulating to GTP-U packet using the generated learning table.

The FPGA unit 220 may process the LBO from the GTP-U packet with high speed and low delay through encapsulation or decapsulation of the GTP-U packet. The FPGA unit 220 may generate a learning table by self-learning packets without the help of a mobile core network using the information for encapsulating or decapsulating GTP-U packets.

The FPGA unit 220 may generate a learning table by decapsulating the GTP-U packet without the help of the mobile core network. To this end, the input GTP-U packet is captured and decapsulated, and the IP information of the outer IP-H, TEID information, and the IP information of the inner IP-H are obtained from the decapsulated GTP-U packet, and then the learning table including the obtained information may be configured.

For example, the FPGA unit 220 transmits the GTP-U packet whose UDP-H destination port value has a predetermined value in the input GTP-U packet to the IP-H separation logic and bypasses the remaining packets. Then, the IP-H separation logic is used to extract outer IP-H information from the GTP-U packet, the GTP-H separation logic is used to extract TEID information from the GTP-U packet, and the inner IP-H separation logic is used to extract inner IP-H information from the GTP-U packet.

The FPGA unit 220 may encapsulate the input packet into a GTP-U packet using the generated learning table. To this end, the FPGA unit 220 searches for the source IP address of the inner IP header matching the destination IP address of the IP header of the input packet in the learning table, and can be encapsulated into a GTP-U packet with the TEID value and IP-H IP information in the matching learning table according to the search result.

In the searching step of the learning table, the FPGA unit 220 may search the learning table for an index value having the source IP value of the inner IP-H of the learning table that matches the destination IP value of the IP-H of the input packet. In the step of encapsulating into the GTP-U packet, the FPGA unit 220 encapsulates the GTP header adder logic after generating the GTP-H in the input packet by using the TEID value of the learning table having the searched index value. Subsequently, the UDP header adder logic generates and encapsulates the UDP-H in the input packet. Subsequently, the outer IP header adder logic generates and encapsulates the outer IP-H in the input packet by using the outer IP-H value of the learning table having the searched index value. Next, the Ether-H adder logic generates Ether-H in the input packet and encapsulates it to generate the output GTP-U packet.

When the destination IP address of the inner IP-H of the GTP-U packet corresponds to the address of the LBO area, the FPGA unit 220 decapsulates the GTP-U packet and transmits the generated local IP packet to the local server through the network interface 210.

When data is registered in the learning table, the FPGA unit 220 checks the count value of the learning table at a predetermined default time using an external timer. If the count value is more than a predetermined default value, the corresponding learning table index is may be deleted. As another example, the FPGA unit 220 may determine the GTP-C packet from the input packet, check the message type value of the GTP-C packet header, and delete the index of the learning table having a predetermined message type value.

The FPGA unit 220 may obtain information for encapsulation or decapsulation of the GTP-U packet by using the GTP-C packet. For example, the FPGA unit 220 determines a GTP-C packet from an input packet through an UDP-H Port GTP packet verification logic. Subsequently, information for GTP-U packet encapsulation or decapsulation may be obtained from the input GTP-C according to the message type value by checking the message type value of the GTP-C packet header.

The memory 230 stores the learning table generated through the FPGA unit 220 and provides the learning table according to the request of the FPGA unit 220.

In a mobile network, since the GTP-U packet encapsulation or decapsulation process is implemented in a hardware-based structure, the LBO of the GTP-U packet can be processed at high speed, thus achieving low packet delay and high speed processing.

And, as the information for the encapsulation or decapsulation process of GTP-U packets is independently acquired without the help of the mobile core network through self-learning, the difficulty of protocol interworking with the mobile core network can be solved.

In addition, since information after a predetermined time for the configured learning table can be deleted, free storage space can be secured.

And also, information for encapsulation or decapsulation of a GTP-U packet may be obtained by using a GPRS Tunneling Protocol Control (GTP-C, hereinafter referred to as 'GTP-C') packet.

The present disclosure has been described above with respect to embodiments. It will be apparent to those of ordinary skill in the technical field to which the present disclosure pertains that the present disclosure may be implemented in a modified form without departing from the essential characteristics of the present disclosure. Therefore, the embodiments set forth herein should be considered in a descriptive sense only and not for purposes of limitation. The scope of the present disclosure is defined in the claims rather than the foregoing description, and all differences equivalent thereto should be interpreted as being included in the present disclosure.

What is claimed is:

1. A method of processing packet of General Packet Radio Service (GPRS) tunneling protocol user plane (GTP-U), using a packet processing apparatus in a mobile network, the method comprising:
   decapsulating the GTP-U packet and obtaining information;
   generating a learning table using the obtained information;
   encapsulating an input packet in the GTP-U packet using the generated learning table;
   searching the learning table for a source IP address of an inner IP header that matches a destination IP address of the inner IP header of the input packet; and
   encapsulating, in the GTP-U packet, the value of a tunneling endpoint identifier (TEID) and IP information of IP-Header (IP-H) in the matched learning table according to the search result.

2. The method of claim 1, wherein in the decapsulating of the GTP-U packet and the obtaining of the information,
   obtaining an IP information of outer IP-Header (IP-H), (the TEID) information and an IP information of inner IP-Header (IP-H) from the input GTP-U packet, and
   wherein the IP information of the outer IP-H is an IP address of the base station, the IP information of the inner IP-H is an IP address of the user element, and the TEID information is a tunnel ID distinguished for each user element.

3. The method of claim 1, wherein in the decapsulating of the GTP-U packet and the obtaining of the information,
   transmitting a GTP-U packet having a predetermined UDP-Header (UDP-H) destination port value among the input GTP-U packet to an IP-H separation logic;
   extracting an outer IP-H information from the GTP-U packet using IP-H separation logic;
   extracting a TEID information from the GTP-U packet using GTP-Header (GTP-H) separation logic; and
   extracting an inner IP-H information from the GTP-U packet using inner IP-H separation logic.

4. The method of claim 1, further comprising:
   obtaining the information for encapsulation or decapsulation of the GTP-U packet by using GPRS Tunneling Protocol Control (GTP-C) packet.

5. The method of claim 4, further comprising:
   by an UDP-H Port GTP packet verification logic, determining a GTP-C packet from the input packet; and
   obtaining the information for encapsulation or decapsulation of the GTP-U packet from the input GTP-C packet according to a value of message type, by checking the value of the message type of a GTP-C packet header.

6. The method of claim 1, wherein in the searching the learning table, search the learning table for an index value having the source IP value of the inner IP-H of the learning table that matches the destination IP value of the IP-H of the input packet, and
   wherein the encapsulating to GTP-U packet further comprising,
   generating a GTP-H in the input packet by using the TEID value of the learning table having the searched index value by a GTP header adder logic, and then encapsulating the input packet containing the GTP-H;

generating a UDP-H in the input packet by a UDP header adder logic and then encapsulating the input packet containing the UDP-H;

generating an outer IP-H in the input packet by using the outer IP-H value of the learning table having the searched index value by an outer IP header adder logic, and encapsulating the input packet containing the IP-H; and generating an Ether-Header (Ether-H) in the input packet by an Ether-H adder logic, encapsulating the input packet containing the Ether-H and generating an output GTP-U packet.

7. The method of claim 1 further comprising, transmitting the local IP packet generated by decapsulating the GTP-U packet to a local server, if the destination IP address of the inner IP-H of the GTP-U packet corresponds to the address of the LBO area.

8. The method of claim 1 further comprising, when new data is registered in the learning table, deleting the index with a count value more than a predetermined default value in the learning table if the count value is more than the predetermined default value after checking the count value of indexes in the learning table at a preset default time using an external timer.

9. The method of claim 1 further comprising, determining a GTP-C packet from the input packet; and deleting the index of the learning table having a message type assigned with a predetermined value in different message types assigned with different values, by checking the value of the message type of the GTP-C packet header.

10. An apparatus of processing packet comprising:

a network interface for transmitting and receiving packets;

a field-programmable gate array (FPGA) unit for decapsulating a General Packet Radio Service (GPRS) tunneling protocol user plane (GTP-U) packet received through the network interface and obtaining information;

generating a learning table using the obtained information; and encapsulating an input packet in the GTP-U packet using the generated learning table; and a memory storing the learning table, wherein the FPGA unit searches the learning table for a source IP address of an inner IP header that matches a destination IP address of the inner IP header of the input packet; and encapsulates, in GTP-U packet, the value of a tunneling endpoint identifier (TEID) and IP information of IP-Header (IP-H) in the matched learning table according to the search result.

11. The apparatus of claim 10, wherein the FPGA unit obtains an IP information of outer IP-H, a TEID information and an IP information of inner IP-H from the input GTP-U packet, and wherein the IP information of the outer IP-H is an IP address of the base station, the IP information of the inner IP-H is an IP address of the user element, and the TEID information is a tunnel ID distinguished for each user element.

12. The apparatus of claim 10, wherein the FPGA unit deletes the index with a count value more than a predetermined default value in the learning table if the count value is more than the preset default value after checking the count value of indexes in the learning table a preset default time using an external timer, when new data is registered in the learning table.

13. The apparatus of claim 10, wherein the FPGA unit obtains the information for encapsulation or decapsulation of the GTP-U packet by using GTP-C packet.

* * * * *